(12) United States Patent
Chen et al.

(10) Patent No.: US 8,498,639 B2
(45) Date of Patent: Jul. 30, 2013

(54) FLEXIBLE CHANNEL QUALITY INDICATOR REPORTING

(75) Inventors: Wanshi Chen, San Diego, CA (US); Durga Prasad Malladi, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1189 days.

(21) Appl. No.: 12/027,996

(22) Filed: Feb. 7, 2008

(65) Prior Publication Data

US 2008/0214198 A1    Sep. 4, 2008

Related U.S. Application Data

(60) Provisional application No. 60/889,258, filed on Feb. 9, 2007.

(51) Int. Cl.
*H04W 4/00* (2009.01)
*H04B 1/38* (2006.01)
*H04B 1/00* (2006.01)
*H04B 7/00* (2006.01)

(52) U.S. Cl.
USPC ............ 455/434; 455/574; 455/69; 370/252; 370/329; 370/341

(58) Field of Classification Search
USPC ................. 455/434, 450–452.2, 513, 127.5, 455/574, 509, 522, 69, 67.11; 370/252, 329, 370/341
See application file for complete search history.

(56) References Cited

U.S. PATENT DOCUMENTS

| | | | | |
|---|---|---|---|---|
| 7,873,338 | B2* | 1/2011 | Visotsky et al. | 455/226.2 |
| 2002/0060995 | A1* | 5/2002 | Cervello et al. | 370/332 |
| 2005/0289256 | A1* | 12/2005 | Cudak et al. | 710/62 |
| 2006/0089102 | A1* | 4/2006 | Nishio et al. | 455/67.11 |
| 2006/0148411 | A1* | 7/2006 | Cho et al. | 455/67.13 |
| 2006/0287743 | A1 | 12/2006 | Sampath et al. | |
| 2007/0010957 | A1* | 1/2007 | Sampath et al. | 702/57 |
| 2007/0026813 | A1 | 2/2007 | Khan | |
| 2007/0098098 | A1* | 5/2007 | Xiao et al. | 375/260 |
| 2008/0080469 | A1* | 4/2008 | Kolding et al. | 370/342 |

FOREIGN PATENT DOCUMENTS

| | | |
|---|---|---|
| EP | 1679924 | 7/2006 |
| EP | 1750407 | 2/2007 |
| RU | 2003130366 A | 4/2005 |
| WO | 9637084 | 11/1996 |
| WO | WO02075955 | 9/2002 |
| WO | 2004077871 A1 | 9/2004 |
| WO | WO2006138622 | 12/2006 |
| WO | WO2007015728 A1 | 2/2007 |

OTHER PUBLICATIONS

International Search Report—PCT/US08/053510—International Search Authority, European Patent Office—Aug. 21, 2008.
Written Opinion—PCT/US08/053510—International Search Authority, European Patent Office—Aug. 21, 2008.
Taiwan Search Report—TW097104978—TIPO—Oct. 27, 2011.

* cited by examiner

*Primary Examiner* — Wesley Kim
(74) *Attorney, Agent, or Firm* — Liem T. Do

(57) ABSTRACT

System(s) and method(s) are provided that facilitate a flexible channel quality indicator (CQI) reporting directives or policies. A CQI reporting directive delivers an improved tradeoff between reporting accuracy and overhead by establishing subband-specific reporting periods, reporting repetitions, or power requirements. The CQI reporting directive is based at least in part on channel conditions, traffic requirements, and scheduling techniques. Automated optimization and negotiation of a CQI reporting directive based on communication performance is also incorporated.

38 Claims, 11 Drawing Sheets

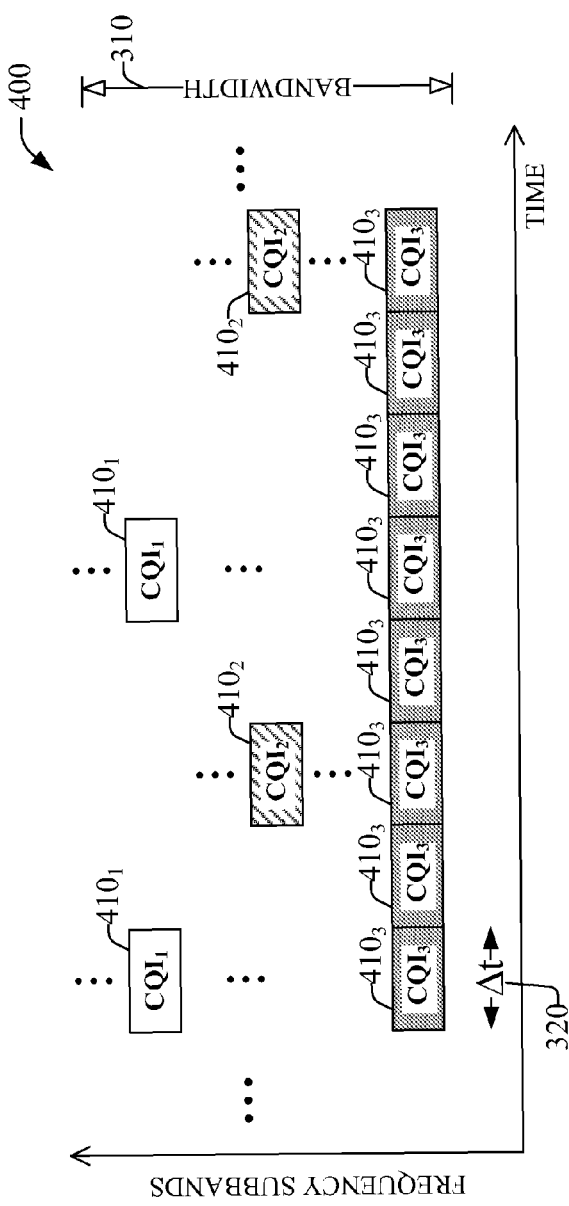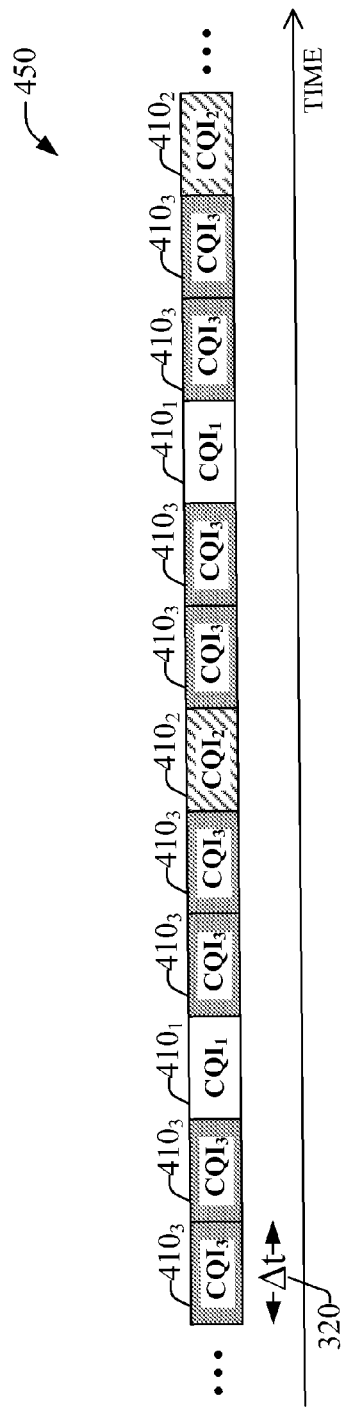
FIG. 4A
FIG. 4B

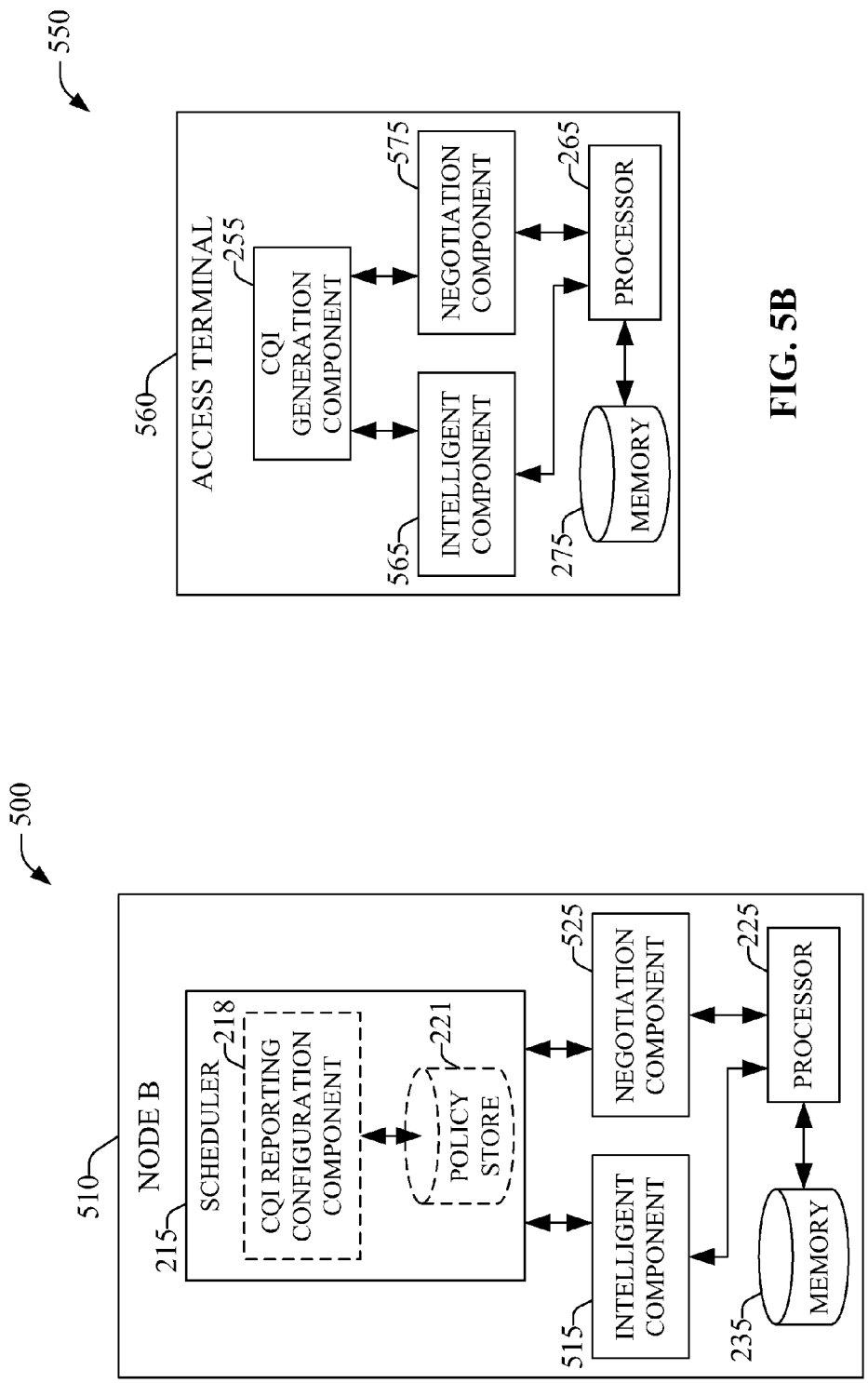

FLEXIBLE CHANNEL QUALITY INDICATOR REPORTING

CLAIM OF PRIORITY UNDER 35 U.S.C. §119

This Application for Patent claims the benefit of U.S. Provisional Application Ser. No. 60/889,258 filed on Feb. 9, 2007, and entitled "FLEXIBLE CHANNEL QUALITY INDICATOR REPORTING." The entirety of this application is expressly incorporated herein by reference.

BACKGROUND

I. Field

The subject specification relates generally to wireless communication and, more particularly, to channel state information reporting in wireless systems.

II. Background

Wireless communication systems are widely deployed to provide various types of communication content such as voice, video, data, and so on. These systems may be multiple-access systems capable of supporting simultaneous communication of multiple terminals with one or more base stations. Multiple-access communication relies on sharing available system resources (e.g., bandwidth and transmit power). Examples of multiple-access systems include code division multiple access (CDMA) systems, time division multiple access (TDMA) systems, frequency division multiple access (FDMA) systems, and orthogonal frequency division multiple access (OFDMA) systems.

Communication between a terminal in a wireless system (e.g., a multiple-access system) and a base station is effected through transmissions over a wireless link comprised of a forward link and a reverse link. Such communication link may be established via a single-input-single-output (SISO), multiple-input-single-output (MISO), or a multiple-input-multiple-output (MIMO) system. A MIMO system consists of transmitter(s) and receiver(s) equipped, respectively, with multiple ($N_T$) transmit antennas and multiple ($N_R$) receive antennas for data transmission. SISO and MISO systems are particular instances of a MIMO system. A MIMO channel formed by $N_T$ transmit and $N_R$ receive antennas may be decomposed into $N_V$ independent channels, which are also referred to as spatial channels, where $N_V \leq \min\{N_T, N_R\}$. Each of the $N_V$ independent channels corresponds to a dimension. The MIMO system can provide improved performance (e.g., higher throughput, greater capacity, or improved reliability) if the additional dimensionalities created by the multiple transmit and receive antennas are utilized.

Regardless the peculiarities of the many available wireless communication systems, in each of these systems operation of a wireless device relies on channel quality indicator (CQI) feedback. Access to CQI, which can represent one of various performance metrics, typically facilitates communication resource assignments which are generally accomplished via scheduler in a base station or node B. Accurate CQI reporting can result in excessive overhead or inadequate latency, with the ensuing deterioration in communication. For example, delay-sensitive, high-rate applications like on-line gaming or packet-switched video telephony in a slowly varying channel demand high-frequency CQI reporting, whereas delay sensitive, low-rate applications executing in a fast changing channel can require a large CQI reporting period. Therefore, there exists a tradeoff between CQI reporting latency—controlled primary by reporting frequency—and reporting overhead—largely determined by volume of reported control data.

Accordingly, a need exists in the art for flexible CQI reporting, capable of accounting for varied communication scenarios in wireless systems.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

The subject innovation generally discloses system(s) and method(s) are that facilitate a flexible channel quality indicator (CQI) reporting directive or policy. In an aspect, a method for channel quality indicator (CQI) reporting in a wireless communication system is disclosed, the method comprising: establishing a CQI reporting directive, the reporting directive further comprising a set of subband-specific dynamic reporting parameters, conveying the CQI reporting directive; and receiving a CQI report according to the reporting directive.

In another aspect, the subject innovation discloses a wireless communication device comprising: a processor configured to generate a CQI reporting directive, wherein the reporting directive further comprises a set of subband-specific dynamic reporting parameters, to transmit the CQI reporting directive, and to receive a CQI report according to the reporting directive; and a memory coupled to the processor.

Yet another aspect discloses a computer program product, comprising a computer-readable medium including: code for causing at least one computer to evaluate a set of performance metrics; code for causing the at least one computer to generate a CQI reporting directive based at least in part on the evaluated set of performance metrics; and code for causing the at least one computer to transmit the CQI reporting directive.

In a yet further aspect, an apparatus that operates in a wireless communication system is disclosed, the apparatus comprising: means for assessing a set of communication performance metrics; means for generating a CQI reporting directive based at least in part on the assessed set of performance metrics; means for optimizing the CQI reporting directive; and means for transmitting the CQI reporting directive.

In one aspect, a method for CQI reporting in a wireless communication system is disclosed, the method comprising: receiving a CQI reporting policy; generating a CQI report according to the received reporting policy; and conveying the generated report.

In another aspect, the innovation discloses a wireless communication device comprising: at least one processor configured to receive a CQI reporting directive, to generate a CQI report according to the received reporting directive, to convey the generated report; and a memory coupled to the at least one processor.

In yet another aspect, it is disclosed a computer program product, comprising a computer-readable medium including: code for causing at least one computer to receive a CQI reporting policy; code for causing the at least one computer to generate a CQI report according to the received reporting policy; and code for causing the at least one computer to transmit the CQI report.

In a further yet aspect, the innovation discloses, an apparatus that operates in a wireless communication system, the apparatus comprising: means for receiving a CQI reporting directive; means for generating a CQI report according to the received reporting directive; and means for transmitting a generated CQI report.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

BRIEF DESCRIPTION OF THE DRAWINGS

FIGS. 4A and 4B are diagrams that illustrate, respectively parallel cyclic CQI reporting with flexible reporting frequency.

FIGS. 5A and 5B illustrate, respectively an example base station and access terminal that infers and negotiates a flexible reporting directive or configuration.

DETAILED DESCRIPTION

Figure 1:
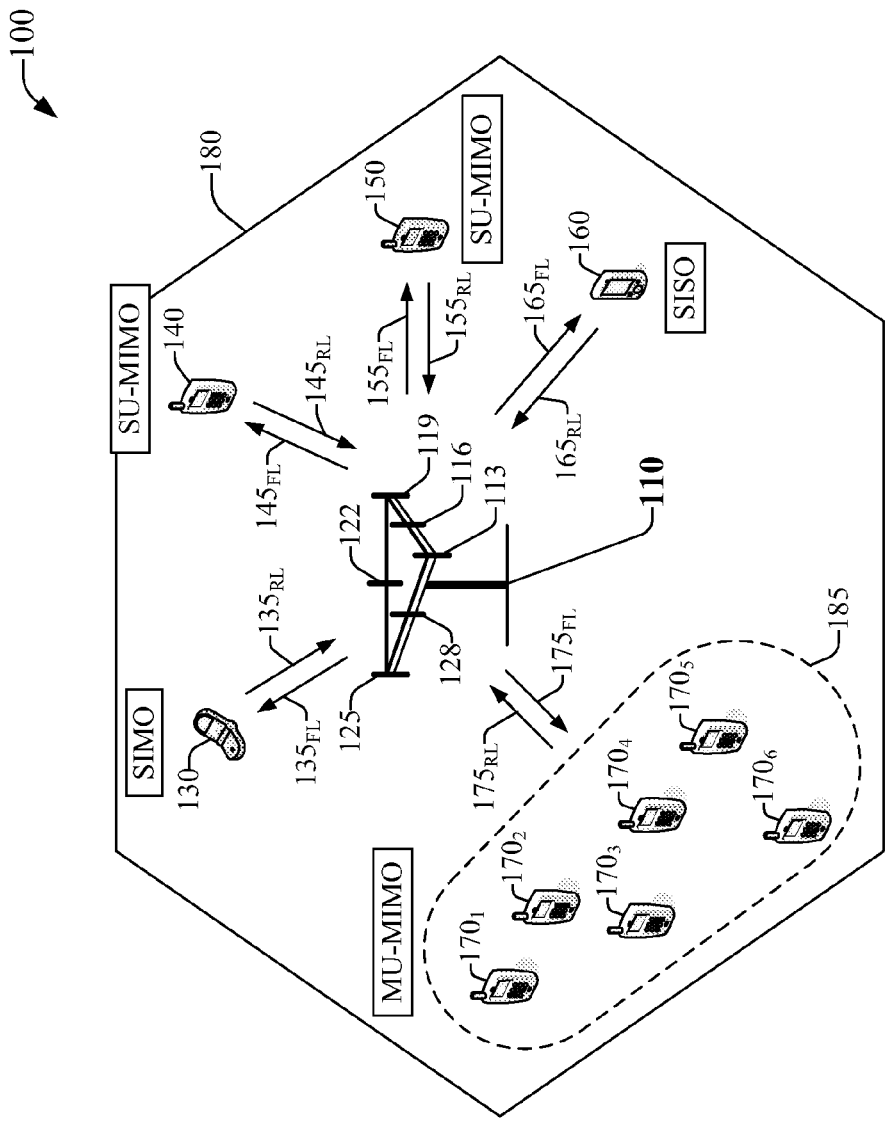
FIG. 1 illustrates a multiple access wireless communication system where an access point with multiple antennas simultaneously can communicate with various access terminals that operate in SIMO, SU-MIMO, and MU-MIMO. The access point can exploit flexible CQI reporting as disclosed herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Various embodiments are described herein in connection with a wireless terminal. A wireless terminal may refer to a device providing voice and/or data connectivity to a user. A wireless terminal may be connected to a computing device such as a laptop computer or desktop computer, or it may be a self contained device such as a personal digital assistant (PDA). A wireless terminal can also be called a system, a subscriber unit, a subscriber station, a mobile station, a mobile terminal, a remote station, an access point, a remote terminal, an access terminal, user terminal, a user agent, a user device, a customer premises equipment, or a user equipment. A wireless terminal may be a subscriber station, wireless device, cellular telephone, PCS telephone, cordless telephone, a session initiation protocol (SIP) phone, a wireless local loop (WLL) station, a personal digital assistant (PDA), a handheld device having wireless connection capability, or other processing device connected to a wireless modem.

A base station may refer to a device in an access network that communicates over the air-interface, through one or more sectors, with wireless terminals. The base station may act as a router between the wireless terminal and the rest of the access network, which may include an IP network, by converting received air-interface frames to IP packets. The base station also coordinates management of attributes for the air interface. Moreover, various embodiments are described herein in connection with a base station. A base station may be utilized for communicating with mobile device(s) and may also be referred to as an access point, Node B, evolved Node B (eNodeB), or some other terminology.

Referring to the drawings, FIG. 1 illustrates a multiple access wireless communication system 100 where an access point 110 with multiple antennas 113-128 simultaneously schedules, and communicates with, various mobile terminals in SIMO, SU-MIMO, and MU-MIMO modes of operation according to aspects disclosed herein. The mode of operation is dynamic: access point 110 can reschedule the mode of operation of each of terminals 130-160 and 170$_1$-170$_6$. Additionally, access point 110 can dynamically adjust reporting settings based on changing operation conditions that result for variations in scheduled operation. In view of the dynamic nature of operation, which includes CQI reporting, FIG. 1 illustrates a snapshot of communication links between terminals and antennas. As illustrated, such terminals can be stationary or mobile and, dispersed throughout a cell 180. As used herein and generally in the art, the term "cell" can refer to base station 110 and/or its coverage geographic area 180 depending on the context in which the term is used. Further, a terminal (e.g., 130-160 and 170$_1$-170$_6$) can communicate with any number of base stations (e.g., shown access point 110) or no base stations at any given moment. It is noted that terminal 130 has a single antenna and therefore it operates in SIMO mode substantially at all times.

Generally, access point 110 possesses $N_T \geq 1$ transmit antennas. Antennas in access point 110 (AP) are illustrated in multiple antenna groups, one including 113 and 128, another including 116 and 119, and an additional including 122 and 125. In FIG. 1, two antennas are shown for each antenna group, even though more or fewer antennas can be utilized for each antenna group. In the snapshot illustrated in FIG. 1, access terminal 130 (AT) operates in SIMO communication with antennas 125 and 122, where antennas 125 and 122 transmit information to access terminal 130 over forward link 135$_{FL}$ and receive information from access terminal 130 over reverse link 135$_{RL}$. Mobile terminals 140 and 150 each communicate in SU-MIMO mode with antennas 119 and 116, while terminal 160 operates in SISO. MIMO channels are formed between each of terminals 140, 150, and 160, and antennas 119 and 116, leading to disparate FLs 145$_{FL}$, 155$_{FL}$, 165$_{FL}$, and disparate RLs 145$_{RL}$, 155$_{RL}$, 165$_{RL}$. Additionally, in the snapshot of FIG. 1, a group 185 of terminals 170$_1$-170$_6$ is scheduled in MU-MIMO, having formed multiple MIMO channels between the terminal in the group 185 and antennas 128 and 113 in access point 110. Forward link 175$_{FL}$ and reverse link RL 175$_{RL}$ indicate the multiple FLs and RLs existing between terminals 170$_1$-170$_6$ and base station 110. Furthermore, access point 110 can exploit OFDMA in order to accommodate communication from, and to, the disparate groups of mobile stations. It should be appreciated that disparate devices in cell 180 can execute disparate applications; accordingly, CQI reporting can proceed based on reporting policies established by an operator of access point 110.

In an aspect, advanced system such as LTE can exploit MIMO operation within both frequency division duplex (FDD) communication and time division duplex (TDD) communication. In FDD communication, links 135$_{RL}$-175$_{RL}$ employs different frequency bands from respective links 135$_{FL}$-175$_{FL}$. In TDD communication, links 135$_{RL}$-175$_{RL}$ and 135$_{FL}$-175$_{FL}$ utilize the same frequency resources; however, such resources are shared over time among forward link and reverse link communication.

In another aspect, system 100 can utilize one or more multiple-access schemes, in addition to OFDMA, such as CDMA, TDMA, FDMA, single-carrier FDMA (SC-FDMA), space division multiple access (SDMA), or other suitable multiple-access schemes. TDMA utilizes time division multiplexing (TDM), wherein transmissions for different terminals 130-160 and 170$_1$-170$_6$ are orthogonalized by transmitting in different time intervals. FDMA utilizes frequency division multiplexing (FDM), wherein transmissions for different terminals 130-160 and 170$_1$-170$_6$ are orthogonalized by transmitting in different frequency subcarriers. As an example, TDMA and FDMA systems can also use code division multiplexing (CDM), wherein transmissions for multiple terminals (e.g., 130-160 and 170$_1$-170$_6$) can be orthogonalized using different orthogonal codes (e.g., Walsh-Hadamard codes) even though such transmissions are sent in the same time interval or frequency subcarrier. OFDMA utilizes orthogonal frequency division Multiplexing (OFDM), and SC-FDMA utilizes single-carrier FDM. OFDM and SC-FDM can partition the system bandwidth into multiple orthogonal subcarriers (e.g., tones, bins, . . . ), each of which can be modulated with data. Typically, modulation symbols are sent in the frequency domain with OFDM and in the time domain with SC-FDM. Additionally or alternatively, the system bandwidth can be divided into one or more frequency carriers, each of which can contain one or more subcarriers. Disparate carriers, or subbands (e.g., a set of tones), can be designated or scheduled for disparate terminals, or for different applications. To simplify system design, a homogenous traffic model can be preferred for a specific set of subbands, which can lead to substantially negligible heterogeneous traffic in each subband in the set of subbands. As an example, one or more subbands can be specified for voice-over-IP (VoIP) traffic only, while remaining subbands can be primarily targeted for high data rate applications (e.g., file transfer protocol (FTP)). As indicated above, specific assignments of subbands can dynamically change in response to changing traffic needs. Moreover, CQI reporting directives can also vary dynamically in response to traffic changes. An additional source of dynamic changes of subband assignment, and associated CQI reporting, can originate in performance (e.g., sector or cell throughput, data peak rate) gain or loss when mixing various traffics into one subband. While CQI reporting directives, or mechanisms, described herein are generally described for an OFDMA system, it should be appreciated that the CQI reporting directives disclosed herein can similarly be applied to substantially any wireless communication system operating in multiple access.

In a further aspect, base stations 110 and terminals 120 in system 100 can communicate data using one or more data channels and signaling using one or more control channels. Data channels utilized by system 100 can be assigned to active terminals 120 such that each data channel is used by only one terminal at any given time. Alternatively, data channels can be assigned to multiple terminals 120, which can be superimposed or orthogonally scheduled on a data channel. To conserve system resources, control channels utilized by system 100 (for example, to report CQI) can also be shared among multiple terminals 120 using, for example, code division multiplexing. In one example, data channels orthogonally multiplexed only in frequency and time (e.g., data channels not multiplexed using CDM) can be less susceptible to loss in orthogonality due to channel conditions and receiver imperfections than corresponding control channels.

Each group of antennas or the area in which they are designed to communicate (e.g., to convey or receive traffic, or CQI reports and other control data) are often referred to as a sector of the access point. A sector can be an entire cell 180, as illustrated in FIG. 1, or a smaller region (not shown). Typically, when sectorized, a cell (e.g., cell 180) includes a few sectors (not shown) covered by a single access point, like 110. It should be appreciated that the various aspects disclosed herein, and related to flexible CQI reporting, can be used in a system having sectorized and/or unsectorized cells. Furthermore, it should be appreciated that all suitable wireless communication networks having any number of sectorized and/or unsectorized cells are intended to fall within the scope of the hereto appended claims. For simplicity, the term "base station" as used herein can refer both to a station that serves a sector as well as a station that serves a cell. While the following description generally relates to a system in which each terminal communicates with one serving access point (e.g., 110) for simplicity, it should further be appreciated that terminals can communicate with substantially any number of serving access points.

In communication over forward links $135_{FL}$-$175_{FL}$, the transmitting antennas of access point 110 can utilize beamforming (e.g., to effect SDMA communication) in order to improve the signal-to-noise ratio of forward links for the different access terminals 130-160 and $170_1$-$170_6$. Also, an access point using beamforming to transmit to access terminals scattered randomly through its coverage causes less interference to access terminals in neighboring cells than an access point transmitting through a single antenna to all its access terminals. Such a mode of operation can be incorporated into CQI reporting policies exploited by an access point (e.g., AP 110) operating in a wireless system (e.g., system 100).

Additionally, it should be noted that base station 110 can communicate via backhaul network with other base stations (not shown) that serve other cells (not shown) in the cellular network of which cell 180 is part of. Such communication is a point-to-point communication that can be effected over the cellular network backbone, which can employ of T-carrier/E-carrier links (e.g., T1/E1 lines), as well as packet-based internet protocol (IP).

Figure 2:
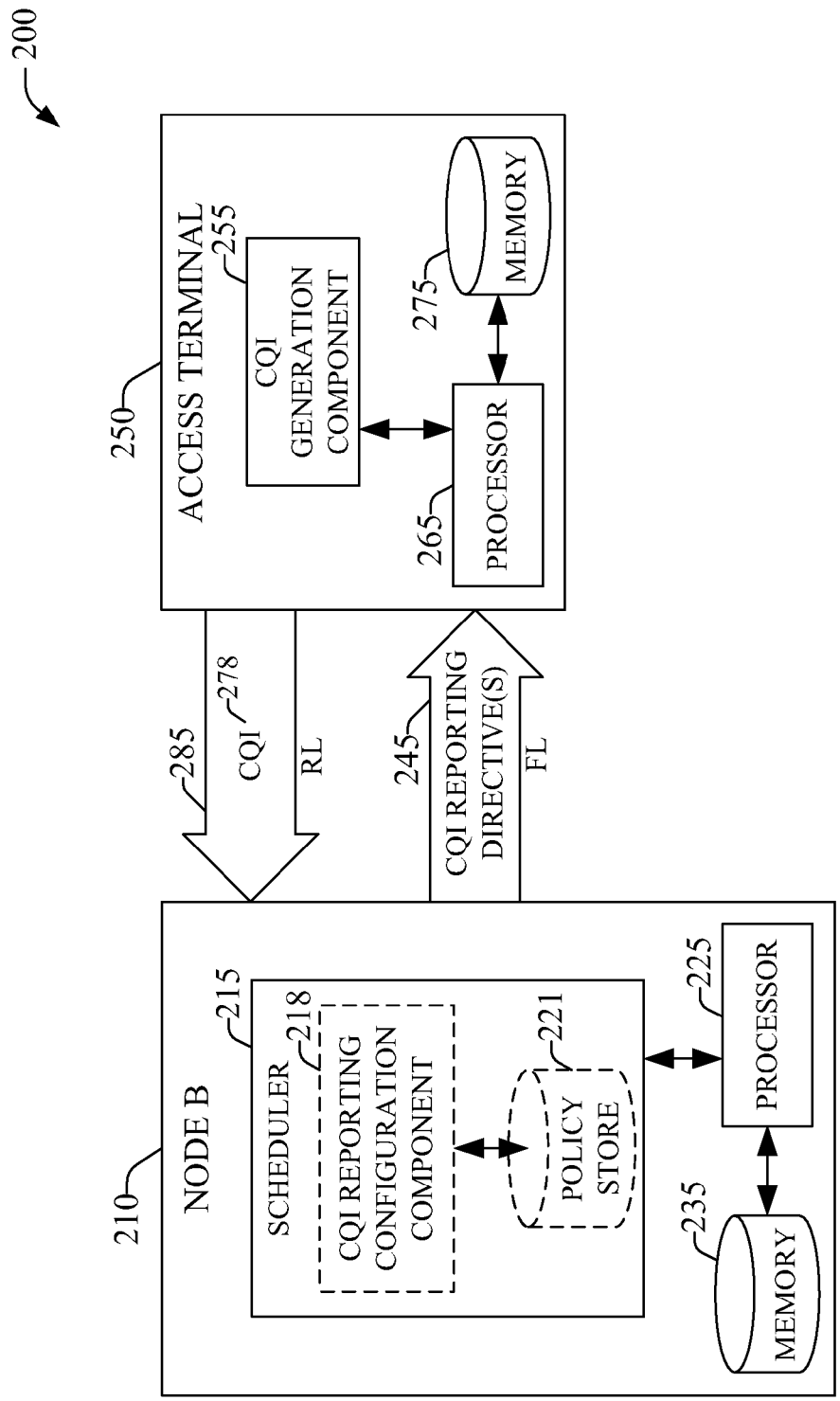
FIG. 2 illustrates an example system that exploits a flexible channel quality indicator reporting in accordance with aspects described in the subject specification.

FIG. 2 illustrates an example system 200 that exploits a policy-based, flexible channel quality indicator reporting. To exploit flexible CQI reporting, node B 210 in system 200 schedules, e.g., via scheduler 215, a specific CQI reporting directive 245 for an access terminal 250. Such a directive establishes frequency-time resources (e.g., subbands and reporting intervals, like number of radio frames or radio subframes) over which a CQI is to be determined. Generally, CQI is determined in a chunk of system bandwidth $\Delta v$ in a time interval $\Delta t$. As an example, in an LTE system, CQI is typically reported over a resource block. The CQI reporting directive 245 can also determine the protocol of the CQI reporting: (i) Cyclic reporting, wherein CQIs for a set of selected subbands are computed are reported cyclically, and sequentially over time; and (ii) parallel reporting, wherein a set of CQIs is determined for multiple frequency resources within a specific time interval (e.g., a transmission time interval) and is conveyed simultaneously. Additionally, the reporting directive 245 can convey a CQI reporting frequency ($1/\tau$) or, alternatively, its reciprocal or reporting period ($\tau$). Reporting frequency can indicate the rate at which a CQI for a specific frequency-time ($\Delta v$-$\Delta t$) resource (e.g., a resource block) is transmitted. In an aspect, reporting directive(s) 245 can establish that CQI is to be determined for specific subbands, such subbands can be assigned to a specific mobile terminal, or a specific application that relies on data communication between a node B 210 an access terminal 250. In another aspect, reporting directive(s) 245 can establish that CQI is to be computed for a specific mobile station; for example, a premium user that utilizes a data intensive application, like a stock broker carrying out a business deal over a wireless link, or a surgeon performing surgery remotely utilizing an automated scalpel with wireless capability, etc. In yet another aspect, reporting directive(s) 245 can contemplate a CQI reporting that is cell specific, wherein channel quality indicators associated with frequency-type resources specific to the selected cell are to be computed. In such a scenario, in the case the cell is indeed a sector that presents fractional frequency reuse, CQI determination associated with unused bandwidth chunks can be waived, which is to say that the directive sets a $1/\tau=0$ (e.g., no reporting) for the unused chunks. In a yet further aspect, CQI reporting directive(s) 245 can be a system-wide directive; for example, the CQI directive can establish the reporting features of a local area, channel-centric network (e.g., a wireless IEEE 802.11b/g network with a ⅓ reuse (e.g., the network utilizes 3 out of the 11 available channels.)

The reporting directive(s) 245 can be conveyed through forward link (FL) 245 and can be configured by a CQI reporting configuration component 218 (referred hereinafter as configuration component 218, unless otherwise indicated) which can reside within scheduler 215. In an aspect, configuration component 218 can exploit resource scheduling information generated scheduler 215. It should be appreciated that scheduler 215 can assign frequency-time resources (e.g., physical or virtual resource blocks), transmission power or power spectral density (PSD), packet format, and system bandwidth. In an aspect, for a specific subband and a selected time intervals (e.g., a TTI, a subframe, a symbol time interval), configuration component 218 can determine, assisted at least in part by processor 225, a sector or cell throughput; transmitted and received data or traffic rate, which can facilitate to monitor a reverse link overhead; power utilization, which includes scheduled power or PSD; and configure reporting protocol and reporting rate. In addition, configuration component 218 can determine a repetition factor of a determined CQI. A CQI repetition factor can facilitate reducing processing overhead at the terminal through the utilization of a determined CQI for a specific communication resource over multiple reporting periods. It should be appreciated that a repetition factor can be specific for each tone in a bandwidth system. As an example, for a slowly varying channel and a low-data rate, error-tolerant application, like picture display, a significant repetition can yield satisfactory quality of service for a user of a mobile station (e.g., access terminal 250). However, a terminal (e.g., a laptop computer) that executes a file transfer application or it is used as a terminal to render a graphical interface of an application executed remotely, can require a smaller repetition factor in order to have an accurate channel description at the terminal through CQI.

Additionally, for a set of terminals that operates in a MU-MIMO configuration, knowledge of a precoding matrix and channel state information can significantly facilitate communication; thus, for subbands that have been scheduled for such a MIMO operation the CQI repetition can be substantially small. It should be appreciated that utilization of a CQI repetition factor for a specific subband can reduce processing overhead in the mobile, and possibly result in a reduction on battery consumption, or in an increasing QoS (e.g.; delay budget; buffer size; packet loss rate; a predetermined data rate, such as a peak data rate, a minimum guaranteed data rate, an average data rate; and the like) in view of processing capacity that can be employed for traffic-related operations rather than control processing; however, it substantially preserves the level of reverse link overhead associated with CQI reporting.

A CQI reporting directive(s) 245 can be stored in memory 235, which even though is illustrated as a single component, it can be distributed and partially reside in scheduler 218. Moreover, it should be appreciated that a CQI reporting directive(s) 245 generated by configuration component 218 can be stored in a policy store 221, which can be utilized as a legacy component to configure CQI reporting based on historical data. Whereas the policy store 221 is illustrated as a stand alone component, it should be appreciated that a portion of its contents can be stored in memory 235. It is noted that policy store 221 can be available to disparate access points through backhaul communication. It is noted that memory 275 in access terminal 250 can also store a (received) CQI reporting directive(s) 245.

It is to be noted that processor 225 is configured to perform a portion, or substantially all, the functional action(s) of components in Node B 210. As illustrated in block diagram 200, memory 235 is coupled to the processor 225 and can be utilized to store various data, instructions, directives, and the like, that facilitate operation of the processor 225.

Access terminal 250 transmits CQI 278 in RL 285 from at least one physical antenna(s) or virtual antenna(s). Reported CQI 239 can abide by CQI required directive(s), while an actual determination of CQI can be readily implemented, as one of ordinary skill in the art would appreciate. Based on a received known pilot sequence (not shown) of symbols that is transmitted by a serving access point (e.g., Node B 210). Various sequences can be employed, for example: a constant amplitude zero autocorrelation (CAZAC) sequence, a pseudorandom code, or a pseudonoise sequence, or a Gold sequence, a Walsh-Hadamard sequence, an exponential sequence, a Golomb sequence, a Rice sequence, an M-sequence, or a generalized Chirp-like (GCL) sequence (e.g., Zadoff-Chu sequence). In an aspect, CQI generation component 255 receives the pilot signal, conveyed according to a specific multiple access mode of operation (e.g., CDMA, FDMA, or TDMA) and determines a CQI. After determination of a CQI index, access terminal 250, via generation component 255, transmits a CQI channel which can consist of a T-bit sequence—e.g., in LTE T=3 or 5; however, other values can be utilized depending on a performance metric like RL 285 overhead or subband throughput associated with subband on which the CQI report is generated. The CQI channel content, e.g., CQI 278, can be modulated with a constant amplitude zero autocorrelation (CAZAC) sequence, or scrambled with a set of short scrambling sequences. The channel quality indication can be based at on a least one of a signal-to-interference ratio, a signal-to-noise ratio, a signal-to-interference-and-noise ratio, etc. In a system relying on MIMO for communication, a mobile station can determine whether to employ physical antennas or virtual antennas for transmission of CQI 278. It should be appreciated that such flexibility arises form the fact that the CQI 278 is processed/determined at the access terminal 250 and Node B 210 can dispense with the knowledge of whether a physical or virtual antenna is employed for CQI transmission, as the actual information that is necessary is the value of the channel quality indication. However, it should be noted that CQI 278 can be detected in Node B 210 through a detection component which provides with suitable decoding electronic circuitry (see FIG. 6).

It is noted that processor 265 is configured to perform a portion, or substantially all, the functional action(s) of components in access terminal 250. As illustrated in block diagram 200, memory 275 is coupled to the processor 225 and can be utilized to store various data, instructions, directives, and the like, that facilitate operation of the processor 265.

Figure 3:
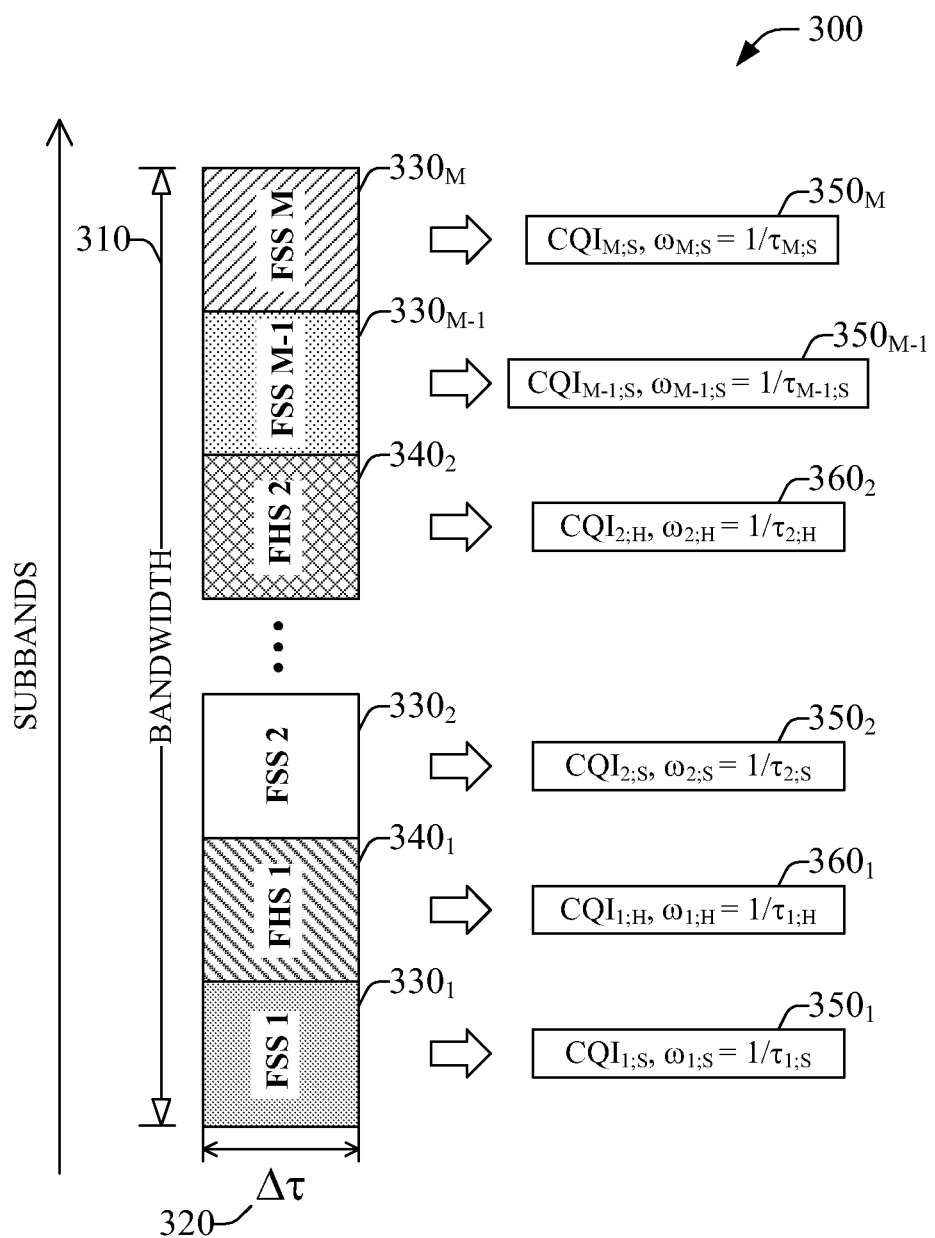
FIG. 3 is a diagram that illustrates flexible subband dependent CQI reporting for frequency selective scheduling (FSS) and frequency hopped, or interleaved, scheduling (FHS).

FIG. 3 is a diagram 300 that illustrates flexible subband dependent CQI reporting for frequency selective scheduling (FSS) and frequency hopped, or interleaved, scheduling (FHS). In diagram 300, system bandwidth 310 over a reporting period $\Delta t$ 320 is divided in M FSS chunks $330_1$-$330_M$ and 2 FHS chunks FHS 1 $340_1$ and FHS 2 $340_2$. FSS frequency blocks 3301-330M are narrow band blocks that include spectrally contiguous subcarriers which can be occupied by scheduled (e.g., scheduled by scheduler 215) data and control packets, whereas FHS frequency blocks $340_1$ and $340_2$ can comprise spectrally non-contiguous tones over a large band, and the tones can be occupied by traffic and control packets. In an aspect illustrated in diagram 300, a reporting directive 245 can establish a single $CQI_{\lambda;S}$ $350_\lambda$ is reported per FSS subband $330_\lambda$, with $\lambda$=1, 2, . . . , M. Additionally, in diagram 300, the reporting frequency of each reported $CQI_{\lambda;S}$ $340_\lambda$ is $\omega_{\lambda;S}$=1/$\tau_{\lambda;S}$. It should be appreciated that reporting frequencies $\omega_{\lambda;S}$ $340_\lambda$ are generally different, and their relative magnitude are determined in CQI reporting directive(s) 245 as discussed above in connection with FIG. 2. Regarding FHS 1 $340_1$ and FHS 2 $340_2$, in an aspect illustrated in diagram 300 reporting CQI frequencies are $\omega_{1;H}$=1/$\tau_{1;H}$ $360_1$ and $\omega_{2;H}$=1/$\tau_{2;H}$ $360_2$; such frequencies are typically substantially the same. It is noted that scheduling of more than two FHS frequency blocks is possible, even though diagram 300 illustrates two such blocks.

FIG. 4A is a diagram 400 that illustrates parallel CQI reporting of three subbands with flexible reporting frequency and a repetition factor of $\rho$=1, which indicates that 100% of determined CQI reports are repeated per reporting period $\Delta t$ 320. It should be appreciated that repetition factor r obeys $0 \leq \rho \leq 1$, with $\rho$=0 indicating that no repetition of a CQI report is allowed to take place. Values of $\rho$ other than 1 (illustrated in diagram 400) are contemplated by the subject innovation. In an aspect illustrated in diagram 410, reporting frequency $\omega_1$ $CQI_1$ $410_1$ for a subband $\nu$=1 equals a reporting frequency $\omega_2$ of $CQI_2$ $410_2$ for a subband $\nu$=2. In contrast, reporting frequency $\omega_3$ of $CQI_3$ $410_3$ displays a ratio of 4 when compared to $\omega_1$ and $\omega_2$. Such an illustration indicates that reporting for subband $\nu$=3 incurs 4 times the overhead of reporting for bands $\nu$=1 and $\nu$=2, whereas the latency of reporting thereof is 4 times larger than that of reporting $CQI_3$ $410_3$.

FIG. 4B is a diagram 450 that illustrates cyclic CQI reporting with flexible reporting frequency and a repetition factor of 1, for CQI reports of subbands $\nu$=1, 2, and 3 as in diagram 410, conveyed cyclically in a selected disparate subband. Reporting frequencies are substantially the same as in diagram 400. As noted above, repetition factor can be different than one.

FIG. 5A illustrates an example embodiment 500 of a base station that infers and negotiates a reporting directive, or policy. Intelligent component 515 can collect current and historic data on communication and CQI reporting performance and infer an optimized reporting directive according to various aspects that can affect CQI reporting and a tradeoff between reporting latency and overhead, such as (1) CQI report repetition parameters; (2) a tolerated BER of reported CQI; antenna configuration; (3) specific applications executed in served terminals; (4) traffic demand; (5) cell/sector load; (6) type of users (e.g., data intensive user, latency sensitive users, users with extended periods of activity or sporadic users, premium users, promotional users, and the like); (7) weather and geographic conditions; (8) and seasonal conditions, such as increased foliage in cell during spring, rain in summer, heavy snow in winter, and so on. Inference of an optimized reporting directive can be accomplished at least through analysis of input information (1)-(8) and utilization of multi-agent modeling or game theory, as well as other advanced mathematical algorithms that incorporate learning and knowledge propagation. An inferred optimal reporting directive can be conveyed to an access terminal for utilization (e.g., in the manner discussed in connection with FIG. 2) or for negotiation. Negotiation of a directive can be accomplished through a negotiation component 525, which in an aspect can convey to the access terminal projected performance based on the new CQI reporting directive, as well as projected communication resource levels to be scheduled to implement the optimized directive.

As employed hereinbefore, and in other portions of the subject specification, the term "intelligence" refers to the ability to reason or draw conclusions about, e.g., infer, the current or future state of a system based on existing information about the system. Artificial intelligence can be employed to identify a specific context or action, or generate a probability distribution of specific states of a system without human intervention. Artificial intelligence relies on applying advanced mathematical algorithms—e.g., decision trees, neural networks, regression analysis, cluster analysis, genetic algorithms, and reinforced learning—to a set of available data (information) on the system.

In particular, to the accomplishment of the various automated aspects described above in connection with policies for load indicator generation and other automated aspects relevant to the subject innovation described herein, an AI component (e.g., component 320) can employ one of numerous methodologies for learning from data and then drawing inferences from the models so constructed, e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.

FIG. 5B illustrates an example embodiment 550 of a base station that infers and negotiates a CQI reporting configuration. Through an intelligent component 565, an access terminal 560 can infer an optimal CQI reporting configuration based on performance metrics (e.g., CQI, other sector interference, a current buffer size, queued traffic packets, a MIMO mode of operation, antenna configuration, and the like) available to the terminal, either through measurements or extrinsic reception. Based on machine learning techniques, intelligent component 565 can determine an optimal reporting pattern that optimizes the access terminal performance (e.g., battery power, buffer utilization, processing and communication overhead, transmission power, and so on), which includes various sets of optimized reporting parameters; namely, reporting periods, probed subband profiles, repetition of CQI reports, and the like. Access terminal 560 can negotiate an optimized reporting configuration with a base station (e.g., node B 510) through a negotiation component 575 with substantially the same functionalities as negotiation component 525. It should be appreciated that the addition of intelligent component 565 to a mobile terminal (e.g., access terminal 550) can increase complexity and processing overhead, the advantage(s) of inferring an optimal CQI reporting configuration can offset costs associated with such complexity.

In connection with the added complexity, multi-core processor(s) (e.g., processor 265) can be employed to handle the computational demand of operating an AI component while simultaneously operating the mobile terminal. It should be appreciated that alternative, or additional, architectures for processor 265 can be utilized for efficient operation of intelligent component (e.g., component 565) and negotiation component 575. Depending on the application executed by terminal 560, a terminal's display graphics processing unit can operate the intelligent component while graphical user interface in the phone is not actively utilized, such as is the case in a voice-only communication or data application with low-frequency display refresh, etc.

Figure 6:
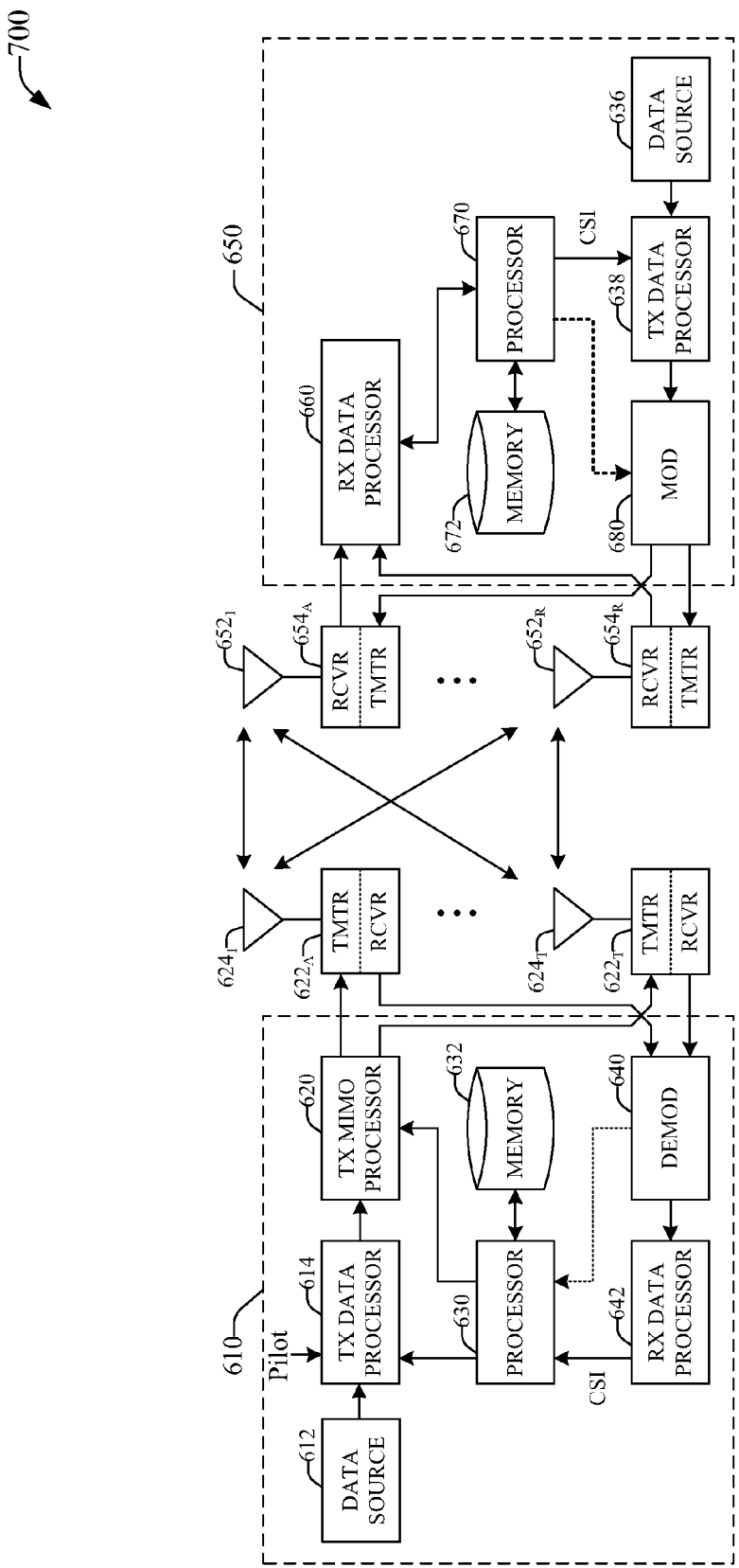
FIG. 6 is a block diagram of an example embodiment of a transmitter system and a receiver system in MIMO operation that can exploit aspects described in the subject specification.

FIG. 6 is a block diagram 600 of an embodiment of a transmitter system 610 (such as Node B 210) and a receiver system 650 (e.g., access terminal 250) in a multiple-input multiple-output (MIMO) system that can provide for cell (or sector) communication in a wireless environment in accordance with one or more aspects set forth herein. At the transmitter system 610, traffic data for a number of data streams can be provided from a data source 612 to transmit (TX) data processor 614. In an embodiment, each data stream is transmitted over a respective transmit antenna. TX data processor 614 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and can be used at the receiver system to estimate the channel response. The multiplexed pilot and coded data for each data stream is then modulated (e.g., symbol mapped) based on a particular modulation scheme (e.g., binary phase-shift keying (BPSK), quadrature phase-shift keying (QPSK), multiple phase-shift keying (M-PSK), or M-ary quadrature amplitude modulation (M-QAM)) selected for that data stream to provide modulation symbols. The data rate, coding, and modulation for each data stream may be determined by instructions executed by processor 630, the instructions as well as the data may be stored in memory 632.

The modulation symbols for all data streams are then provided to a TX MIMO processor 620, which may further process the modulation symbols (e.g., OFDM). TX MIMO processor 620 then provides $N_T$ modulation symbol streams to $N_T$ transceivers (TMTR/RCVR) $622_A$ through $622_T$. In certain embodiments, TX MIMO processor 620 applies beamforming weights (or precoding) to the symbols of the data streams and to the antenna from which the symbol is being transmitted. Each transceiver 622 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers $622_A$ through $622_T$ are then transmitted from $N_T$ antennas $624_1$ through $624_T$, respectively. At receiver system 650, the transmitted modulated signals are received by $N_R$ antennas $652_1$ through $652_R$ and the received signal from each antenna 652 is provided to a respective transceiver (RCVR/TMTR) $654_A$ through $654_R$. Each transceiver $654_1$-$654_R$ conditions (e.g., filters, amplifies, and downconverts) a respective received signal, digitizes the conditioned signal to provide samples, and further processes the samples to provide a corresponding "received" symbol stream.

An RX data processor 660 then receives and processes the $N_R$ received symbol streams from $N_R$ transceivers $654_1$-$654_R$ based on a particular receiver processing technique to provide $N_T$ "detected" symbol streams. The RX data processor 660 then demodulates, deinterleaves, and decodes each detected symbol stream to recover the traffic data for the data stream. The processing by RX data processor 660 is complementary to that performed by TX MIMO processor 620 and TX data processor 614 at transmitter system 610. A processor 670 periodically determines which pre-coding matrix to use, such a matrix can be stored in memory 672. Processor 670 formulates a reverse link message comprising a matrix index portion and a rank value portion. Memory 672 may store instructions that when executed by processor 670 result in formulating the reverse link message. The reverse link message may comprise various types of information regarding the communication link or the received data stream, or a combination thereof. In particular, such information can comprise channel quality indicator report(s) (such as CQI 279), an offset for adjusting a scheduled resource, or sounding reference signals for link (or channel) estimation. The reverse link message is then processed by a TX data processor 638, which also receives traffic data for a number of data streams from a data source 636, modulated by a modulator 680, conditioned by transceiver 654$_A$ through 954$_R$, and transmitted back to transmitter system 610.

At transmitter system 610, the modulated signals from receiver system 650 are received by antennas 624$_1$-624$_T$, conditioned by transceivers 622$_A$-622$_T$, demodulated by a demodulator 640, and processed by a RX data processor 642 to extract the reserve link message transmitted by the receiver system 650. Processor 630 then determines which pre-coding matrix to use for determining the beamforming weights and processes the extracted message.

As discussed above, in connection with FIG. 1, a receiver 650 can dynamically scheduled to operate in SIMO, SU-MIMO, and MU-MIMO, depending at least in part on the channel quality indicators reported by said receiver. Next, communication in these modes of operation is described. It is noted that in SIMO mode a single antenna at the receiver ($N_R$=1) is employed for communication; therefore, SIMO operation can be interpreted as a special case of SU-MIMO. Single-user MIMO mode of operation corresponds to the case in which a single receiver system 650 communicates with transmitter system 610, as previously illustrated FIG. 6 and according to the operation described in connection therewith. In such a system, the $N_T$ transmitters 624$_1$-624$_T$ (also known as TX antennas) and $N_R$ receivers 652$_1$-652$_R$ (also known as RX antennas) form a MIMO matrix channel (e.g., Rayleigh channel, or Gaussian channel, with slow or fast fading) for wireless communication. As mentioned above, the SU-MIMO channel is described by a $N_R \times N_T$ matrix of random complex numbers. The rank of the channel equals the algebraic rank of the $N_R \times N_T$ matrix, which in terms of space-time, or space-frequency coding, the rank equals the number $N_V \leq \min\{N_T, N_R\}$ of independent data streams (or layers) that can be sent over the SU-MIMO channel without inflicting inter-stream interference.

In one aspect, in SU-MIMO mode, transmitted/received symbols with OFDM, at tone ω, can be modeled by:

$$y(\omega) = \underline{H}(\omega)c(\omega) + n(\omega). \quad (2)$$

Here, y(ω) is the received data stream and is a $N_R \times 1$ vector, H(ω) is the channel response $N_R \times N_T$ matrix at tone co (e.g., the Fourier transform of the time-dependent channel response matrix h), c(ω) is an $N_T \times 1$ output symbol vector, and n(ω) is an $N_R \times 1$ noise vector (e.g., additive white Gaussian noise). Precoding can convert a $N_V \times 1$ layer vector to $N_T \times 1$ precoding output vector. $N_V$ is the actual number of data streams (layers) transmitted by transmitter 610, and $N_V$ can be scheduled at the discretion of the transmitter (e.g., transmitter 610, Node B 210, or access point 110) based at least in part on channel conditions (e.g., reported CQI according to a reporting approach established by a serving access point) and the rank reported in a scheduling request by a terminal (e.g., receiver 650). It should be appreciated that c(ω) is the result of at least one multiplexing scheme, and at least one precoding (or beamforming) scheme applied by the transmitter. Additionally, c(ω) can be convoluted with a power gain matrix, which determines the amount of power transmitter 610 allocates to transmit each data stream $N_V$. It should be appreciated that such a power gain matrix can be a resource that is assigned to a terminal (e.g., access terminal 250, receiver 650, or UE 160) through a scheduler in the serving node in response, at least in part, to a reported CQI.

Figure 7:
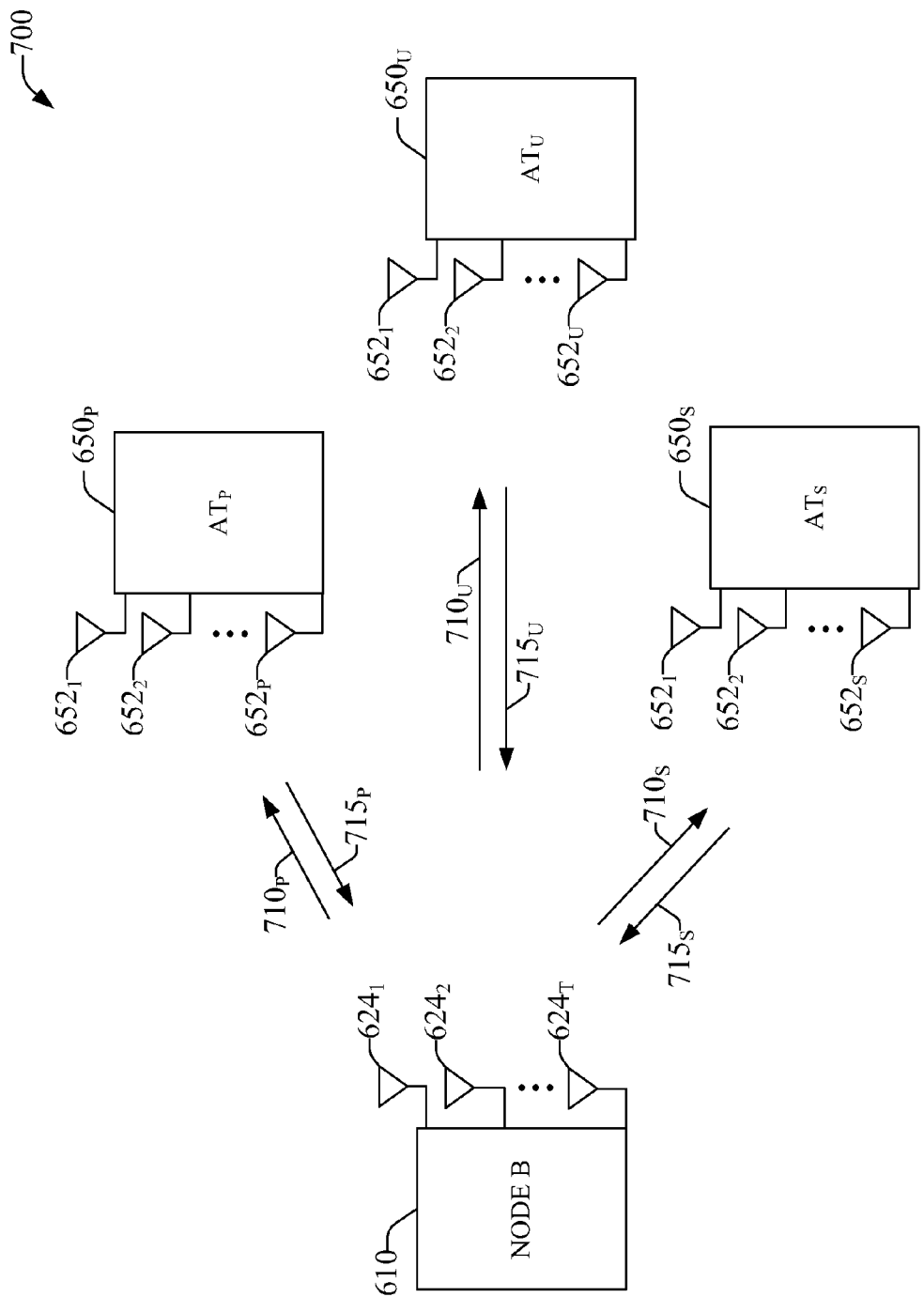
FIG. 7 is a block diagram that illustrates an example MU-MIMO system.

As mentioned above, according to an aspect, MU-MIMO operation of a set of terminals (e.g., mobiles 170$_1$-170$_6$) is within the scope of the subject innovation. Moreover, scheduled MU-MIMO terminals operate jointly with SU-MIMO terminals and SIMO terminals. FIG. 7 illustrates an example multiple-user MIMO system 700 in which three ATs 650$_P$, 650$_U$, and 650$_S$, embodied in receivers substantially the same as receiver 650, communicate with transmitter 610, which embodies a Node B. It should be appreciated that operation of system 700 is representative of operation of substantially any group (e.g., 185) of wireless devices, such as terminals 170$_1$-170$_6$, scheduled in MU-MIMO operation within a service cell by a centralized scheduler residing in a serving access point (e.g., 110 or 250). As mentioned above, transmitter 610 has $N_T$ TX antennas 624$_1$-624$_T$, and each of the ATs has multiple RX antennas; namely, AT$_P$ has $N_P$ antennas 652$_1$-652$_P$, AP$_U$ has $N_U$ antennas 652$_1$-652$_U$, and AP$_S$ has $N_S$ antennas 652$_1$-652$_S$. Communication between terminals and the access point is effected through uplinks 715$_P$, 715$_U$, and 715$_S$. Similarly, downlinks 710$_P$, 710$_U$, and 710$_S$ facilitate communication between Node B 610 and terminals AT$_P$, AT$_U$, and AT$_S$, respectively. Additionally, communication between each terminal and base station is implemented in substantially the same manner, through substantially the same components, as illustrated in FIG. 6 and discussed in the description thereof.

Terminals can be located in substantially different locations within the cell serviced by access point 610 (e.g., cell 180), therefore each user equipment 650$_P$, 650$_U$, and 650$_S$ has its own MIMO matrix channel h$_\alpha$ and response matrix H$_\alpha$ (α=P, U, and S), with its own rank (or, equivalently, singular value decomposition), and its own associated channel quality indicator. Due to the plurality of users present in the cell serviced by the base station 610, intra-cell interference can be present and can affect CQI values reported by each of terminals 650$_P$, 650$_U$, and 650$_S$. The interference can particularly affect the reporting quality level (e.g., BER) of conveyed CQI reports. In an aspect, a CQI reporting directive (e.g., directive(s) 245) for one or more of the terminals can be dynamically modified once the reporting quality level reaches a specific threshold; the threshold depending on specific subband(s) reported. In another aspect, changes in quality level of CQI reporting can trigger node B 610 to allocate a higher CQI transmission power when a specific report deterioration is detected.

Although illustrated with three terminals in FIG. 7, it should be appreciated that a MU-MIMO system can comprise substantially any number of terminals (e.g., group 185 contains six terminals 170$_1$-170$_6$); each of such terminals indicated below with an index k. In accordance with various aspects, each of the access terminals 650$_P$, 650$_U$, and 650$_S$ can report CQI to Node B 610. Such terminals can report CQI from one or more antennas, utilizing a cyclic or parallel reporting approach. The frequency and the spectral characteristics, e.g., which subbands, of such reporting can be dictated by serving Node B 610. In addition, Node B 610 can dynamically re-schedule each of terminals 650$_P$, 650$_U$, and 650$_S$ in a disparate mode of operation, like SU-MIMO or SISO, and establish a disparate CQI reporting directive(s) for each of the terminals.

In one aspect, transmitted/received symbols with OFDM, at tone co and for user k, can be modeled by:

$$y_k(\omega) = \underline{H}_k(\omega)c_k(\omega) + \underline{H}_k(\omega)\Sigma' c_m(\omega) + n_k(\omega). \quad (3)$$

Here, symbols have the same meaning as in Eq. (1). It should be appreciated that due to multi-user diversity, other-user interference in the signal received by user k is modeled with the second term in the left-hand side of Eq. (2). The prime (') symbol indicates that transmitted symbol vector $c_k$ is excluded from the summation. The terms in the series represent reception by user k (through its channel response $H_k$) of symbols transmitted by a transmitter (e.g., access point 250) to the other users in the cell.

Figure 9:
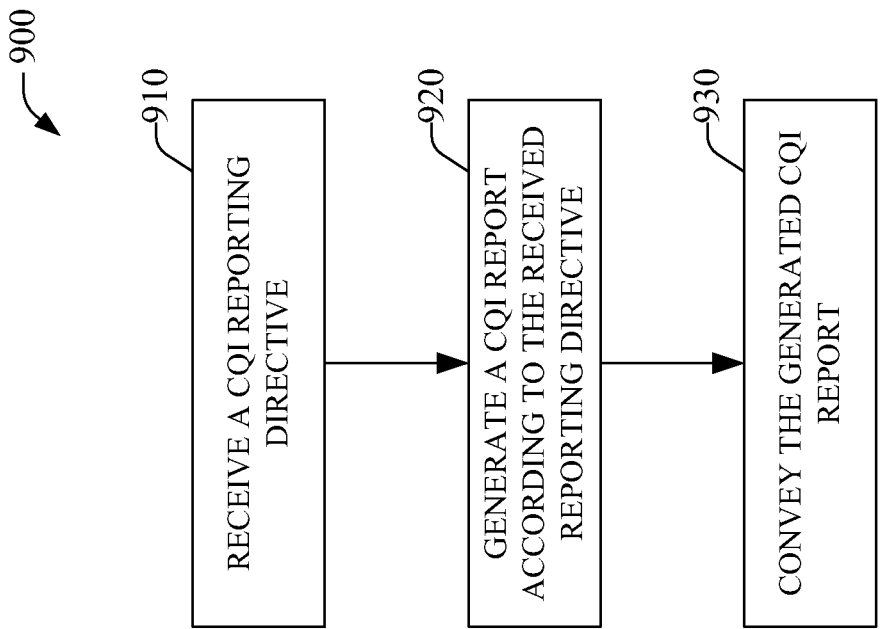
FIG. 9 presents a flowchart of an example method for exploiting a flexible CQI reporting mechanism.
Figure 8:
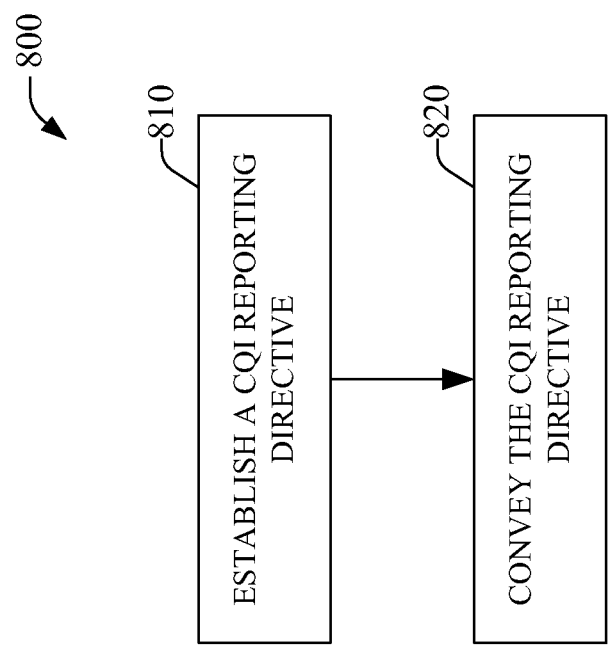
FIG. 8 presents a flowchart of an example method for exploiting a flexible CQI reporting mechanism in accordance with aspects described in the subject specification.
Figure 10:
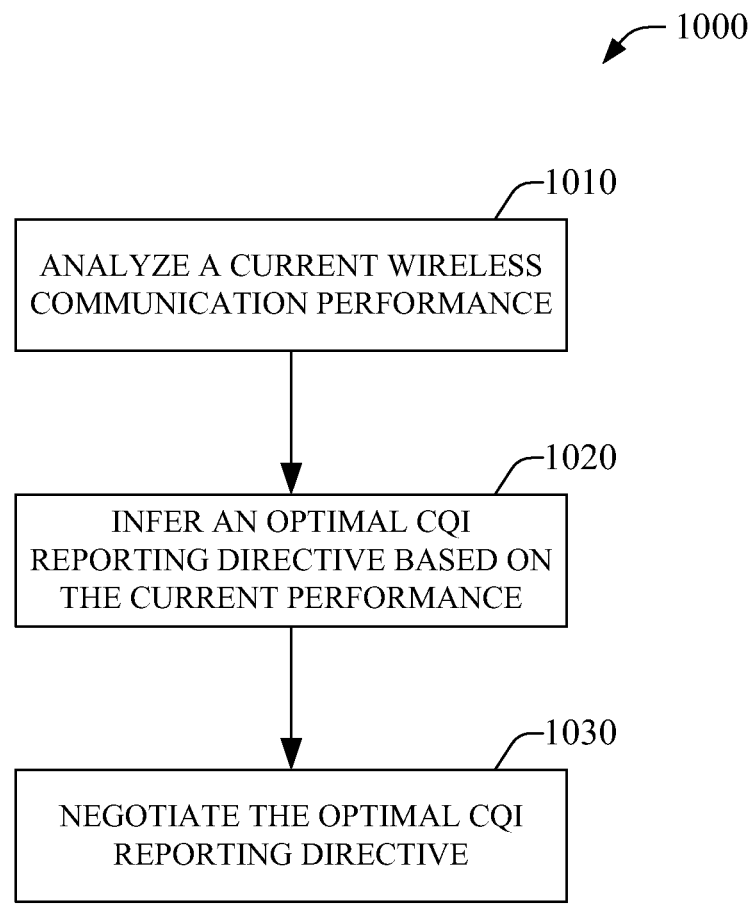
FIG. 10 is a flowchart of an example method that optimizes a reporting directive or configuration according to aspects set forth in the subject specification.

In view of the example systems, and associated aspects, presented and described above, methodologies for flexible channel quality indicator reporting that may be implemented in accordance with the disclosed subject matter can be better appreciated with reference to the flowcharts of FIGS. 8, 9 and 10. While, for purposes of simplicity of explanation, the methodologies are shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g., device, system, process, component, ... ). It should be further appreciated that the methodologies disclosed hereinafter and throughout the subject specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

FIG. 8 is a flowchart of an example method 800 for exploiting a flexible CQI reporting mechanism. At act 810, a CQI reporting directive (e.g., directive 245) is established. Such a directive can carry information on the specifics of CQI reporting that can be performed by a mobile terminal (e.g., access terminal 250, SISO terminal 160, and so on). The CQI reporting directive(s) can indicate the magnitude of reporting frequencies (e.g., rate at which a CQI report is to be conveyed by a terminal) and reporting protocols like cyclic or parallel reporting (e.g., FIGS. 4A and 4B). Additionally, such a reporting directive can include subband configuration, or frequency-time resources in general, over which a CQI is to be determined. Furthermore, format of reported CQI can be made known by the reporting directive(s), wherein a CQI report can be determined to be a T-bit sequence. In an aspect, a CQI reporting directive can be generated by a scheduler (e.g., scheduler 215) in a node B, through a CQI reporting configuration component. In another aspect, a directive can be extracted from a policy store, or a memory, that resides in the scheduler. It is to be noted that the reporting directive(s) can rely on performance metric associated with a serving communication cell, or sector, to determine reporting features. Moreover, it should be appreciated that a reporting directive can be dynamic, changing in response to changes in traffic load, other sector interference, buffer size, scheduled mode of operation of served terminals, tolerated reporting bit error rate and power or power spectral density associated with a CQI report channel.

At act 820, the CQI reporting directive is conveyed. Typically, the reporting directive can be directed toward a specific served mobile station, and thus the directive can be communicated in a unicast message that is terminal-specific. In addition, or alternatively, the CQI reporting directive can be configured for a plurality of served mobile terminals, e.g., the directive can be cell specific, and accordingly the directive can be broadcasted to those terminals that have the broadcasting node B in their active set. It is noted that multicast messages containing a CQI reporting directive (e.g., directive 245) for a specific group of mobile stations can be conveyed. It should be appreciated that CQI reporting directive can be transmitted in an available control channel, or in a dedicated physical channel. Furthermore, the reporting directive can be system-wide, in which case it can be conveyed to mobile stations served by substantially all base stations in the system. To the accomplishment of the latter, the CQI reporting directive first can be communicated to substantially all base stations via backhaul network communication and subsequently broadcasted from each base station that received such a communication.

FIG. 9 is a flowchart of an example method 900 for exploiting a flexible CQI reporting mechanism. At act 910 a CQI reporting directive is received. For example, such received directive can be specific to a mobile terminal, and therefore can be received through a unicast communication, which can be appropriate for a packet switched wireless network infrastructure, like LTE or UMB, or the reporting directive can be cell-wide and thus received through a broadcast message. In a further aspect, it should be appreciated that the CQI reporting directive(s) can be received from a set of base stations included in the active set of the mobile terminal, even though the base station can be a non-service access point. The received reporting directive(s) can facilitate reaching a satisfactory trade-off between excessive CQI reporting, and its ensuing substantial overhead, and adequate frequency reporting to retain satisfactory QoS (e.g., delay budget, packet loss tolerance rate, buffer size, and a predetermined data packet rate like a peak rate and minimum guaranteed rate or an average rate, and so on) for various applications engaged in a wireless communication through the mobile station that receive the directive(s). At act 920 a CQI report is generated according to the received directive. Typically, received known pilot sequences are processed to extract a CQI as established in the reporting directive, which can include a specific set of subbands, one or more reporting periods associated with disparate subbands and reporting time intervals (e.g., a TTI), a determined permissible repetition ratio for a CQI report, an tolerable BER for the reported CQIs, a sequence length associated with a CQI reported channel (e.g., a dedicated channel), and the like. At act 930 the generated CQI report is conveyed. In an aspect, CQI reports are conveyed according to formatting requirements in the received reporting directive.

FIG. 10 is a flowchart of an example method 1000 that optimizes a reporting directive or configuration. At act 1010 a wireless communication performance is analyzed. Such performance can be a current or past performance and typically depends on the specific component that conducts the analysis; for example, a base station can evaluate a sector or cell throughput, can assess cell load; traffic and control demands from disparate wireless devices; scheduled resources like an allocated power or PSD for a set of terminals, or a number of subbands apportioned to a specific set of applications being served in a cell or sector; a number of packets queued for communication, and so on. Alternatively, an access terminal can assess performance based on available antennas and associated CQI, other sector interference, communication power, a current scheduled modulation rate and packet format, a current buffer size, etc. Historic data on communication performance can be retrieved from an ad hoc memory (e.g., memory 235 or 275).

At act 1020 an optimal reporting directive, or configuration, is inferred based on the current wireless communication performance. The inference can be based on historic data stored in an ad hoc memory (e.g., memory 235 or 275) regarding performance metrics and related CQI reporting directive(s) or configuration(s). In an aspect, for a base station, historic data stored in a policy store (e.g., store 221) can be exploited as training and evaluation data in order to learn and evaluate reporting directives that optimize a performance of the base station. It should be appreciated that dynamic changes in wireless channel, system load, other sector interference, utilized power, and the like can result in a wealth of data that can be exploited for supervised or unsupervised learning. Machine learning and associated methodologies and algorithms can be implemented through a processor local processor (e.g., processor 225 or 265). In addition, it should be appreciated that decision trees and other formal instruments for decision making can be conveyed among components in a wireless system; for instance, a decision tree that optimizes the tradeoff between reporting frequency and overhead for a cell serving delay-sensitive terminals can be communicated through backhaul network to substantially all configured base stations. Likewise, an operator can convey to mobile subscribers specific decision making instruments that can execute in a terminal processor.

At act 1030 the optimal reporting directive, or configuration, is negotiated. Negotiation can include communicating the optimal reporting directive in order to receive a counter proposal for directive, wherein such proposal can incorporate adjustment to conveyed reporting directive in order to accommodate performance constraints of the negotiating party. In an aspect, such communication can be effected over the air-interface, utilizing a dedicated control channel. Additionally, depending on the negotiating party, the communication can be component specific and thus conveyed through unicast, it can be group specific and accordingly transmitted via multicast, or the communication can be generic and therefore broadcasted throughout a wireless system.

Next, example systems that can enable aspects of the disclosed subjected matter are described in connection with FIGS. 11 and 12. Such systems can include functional blocks, which can be functional blocks that represent functions implemented by a processor or an electronic machine, software, or combination thereof (e.g., firmware).

Figure 11:
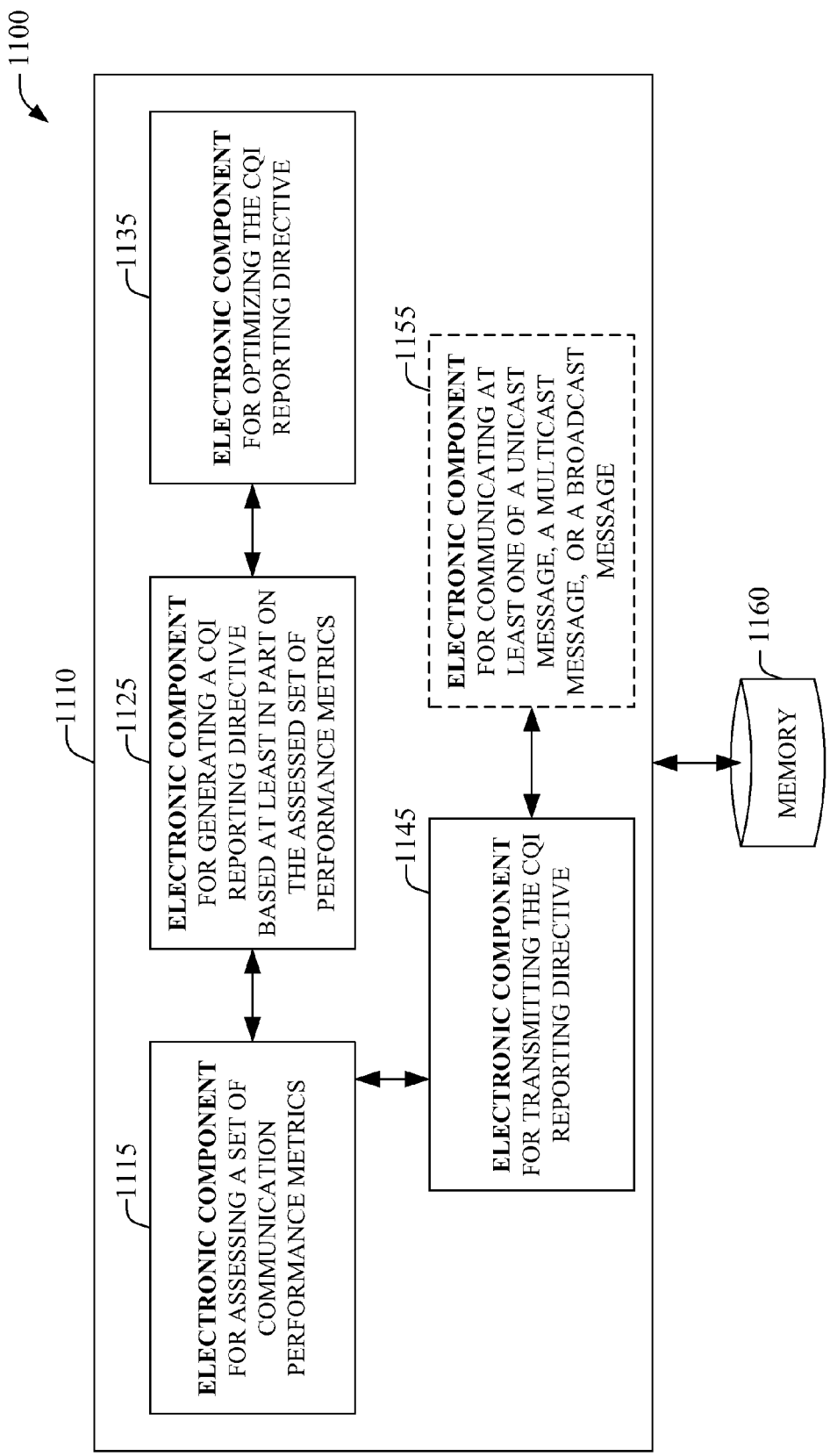
FIG. 11 illustrates a block diagram of an example system that enables exploiting a flexible CQI reporting according to aspects described herein.

FIG. 11 illustrates a block diagram of an example system 1100 that enables exploiting a flexible CQI reporting according to aspects described herein. System 1100 can reside, at least partially, within a base station (e.g., Node B 210). System 1100 includes a logical grouping 1110 of electronic components that can act in conjunction. In an aspect, logical grouping 1110 includes an electronic component 1115 for assessing a set of communication performance metrics, an electronic component 1125 for generating a CQI reporting directive based at least in part on the assessed set of performance metrics; an electronic component 1135 for generating a CQI reporting directive based at least in part on the assessed set of performance metrics, and an electronic component 1145 for optimizing the CQI reporting directive. In addition, system 1100 can include an electronic component 1155 for transmitting the CQI reporting directive. In addition, electronic grouping 1110 can include an electronic component 1165 for communicating at least one of a unicast message, a multicast message, or a broadcast message.

System 1100 can also include a memory 1160 that retains instructions for executing functions associated with electrical components 1115, 1125, 1135, 1145, and 1155, as well as measured or computed data that may be generated during executing such functions. While shown as being external to memory 1160, it is to be understood that one or more of electronic components 1115, 1125, 1135, 1145, and 1155 can exist within memory 11160.

Figure 12:
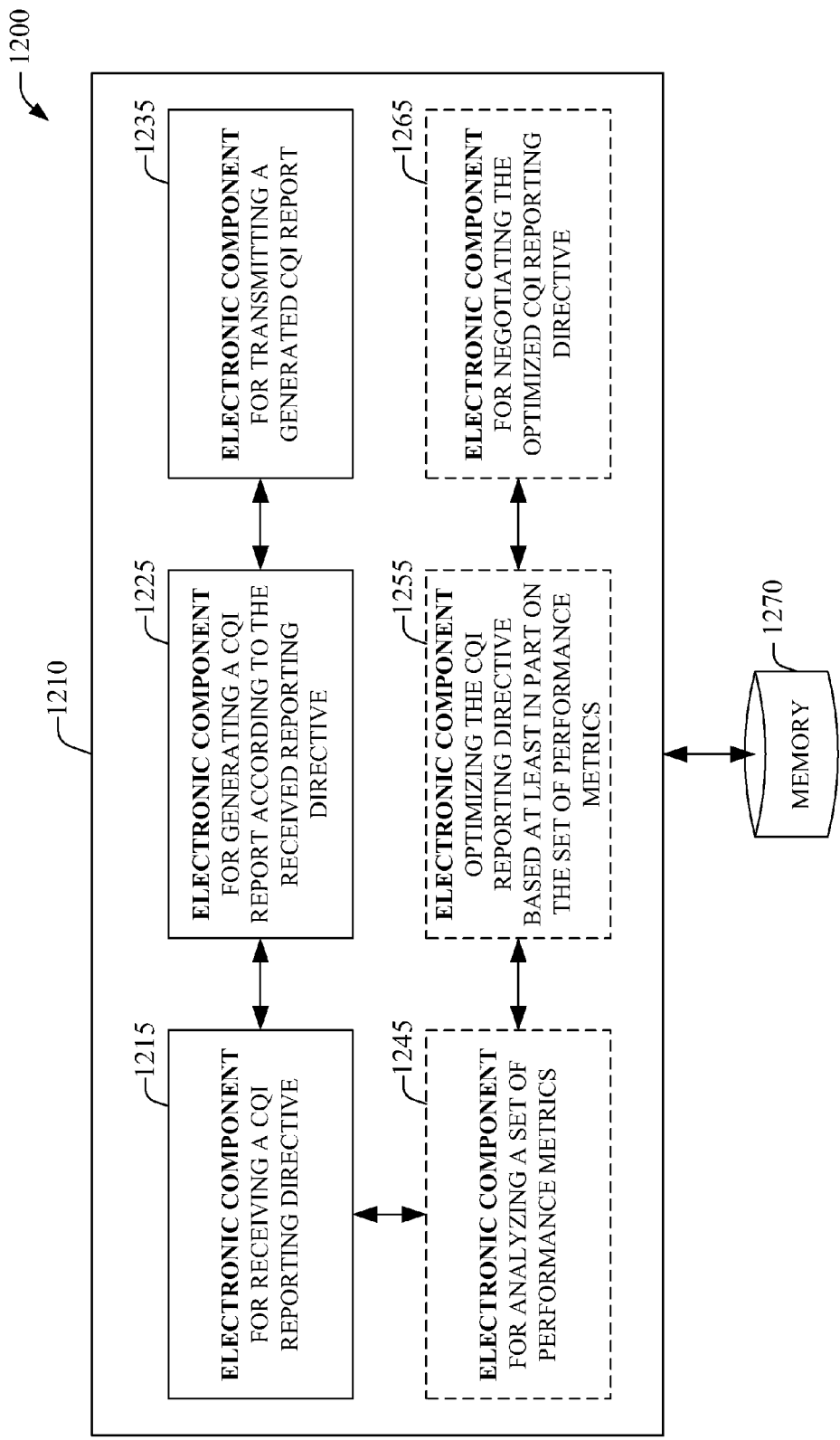
FIG. 12 illustrates a block diagram of an example system that generates a CQI reports based on a policy-based, flexible reporting mechanism, and optimizes and negotiates a CQI reporting directive in accordance with aspects disclosed herein.

FIG. 12 illustrates a block diagram of an example system 1200 that generates a CQI reports based on a policy-based, flexible reporting mechanism. System 1200 can reside, at least partially, within an access terminal (e.g., access terminal 250). System 1200 includes a logical grouping 1210 of electronic components that can act in conjunction. In an aspect, logical grouping 1210 includes an electronic component 1215 for receiving a CQI reporting directive, an electronic component 1225 for generating a CQI report according to the received reporting directive, and an electronic component 1235 for transmitting a generated CQI report. In addition, electronic grouping 1210 can include an electronic component 1245 for analyzing a set of performance metrics, an electronic component 1255 for optimizing the CQI reporting policy based at least in part on the set of performance metrics, and an electronic component 1265 for negotiating the optimized CQI reporting directive.

System 1200 can also include a memory 1270 that retains instructions for executing functions associated with electrical components 1215, 1225, 1235, 1245, 1255, and 1265, as well as measured or computed data that may be generated during executing such functions. While shown as being external to memory 1270, it is to be understood that one or more of electronic components 1215, 1225, 1235, 1245, 1255, and 1265 can exist within memory 1270.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

As it employed herein, the term "processor" can refer to a classical architecture or a quantum computer. Classical architecture comprises, but is not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Quantum computer architecture may be based on qubits embodied in gated or self-assembled quantum dots, nuclear magnetic resonance platforms, superconducting Josephson junctions, etc. Processors can exploit nano-scale architectures such as, but not limited to, molecular and quantum-dot based transistors, switches and gates, in order to optimize space usage or enhance performance of user equipment. A processor may also be implemented as a combination of computing devices, e.g., a combination of a DSP and a microprocessor, a plurality of microprocessors, one or more microprocessors in conjunction with a DSP core, or any other such configuration.

Furthermore, in the subject specification, the term "memory" refers to data stores, algorithm stores, and other information stores such as, but not limited to, image store, digital music and video store, charts and databases. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems and/or methods herein are intended to comprise, without being limited to, these and any other suitable types of memory.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes," "including," "posses," "possessing," or variants thereof are used in either the detailed description or the claims, such terms are intended to be inclusive in a manner similar to the term "comprising" as "comprising" is interpreted when employed as a transitional word in a claim.

What is claimed is:

1. A method for channel quality indicator (CQI) reporting in a wireless communication system, the method comprising:
   establishing a CQI reporting directive, the reporting directive comprising a set of subband-specific dynamic reporting parameters to include within a CQI report, the reporting directive further including a set of subband-specific repetition factors for specifying when a subband-specific CQI is to be used over multiple reporting periods, and a set of subband-specific reporting frequencies for the CQI report;
   conveying the CQI reporting directive; and
   receiving a CQI report according to the reporting directive.

2. The method of claim 1, establishing a CQI reporting directive including evaluating a set of wireless communication performance metrics.

3. The method of claim 1, wherein the subband-specific dynamic reporting parameters change upon changes in at least one of a channel condition, a sector traffic requirement, a sector load and a bit error rate for a CQI report.

4. The method of claim 1, the set of subband-specific dynamic reporting parameters including a set of subband-specific CQI report targeted quality level.

5. The method of claim 1, wherein conveying the CQI reporting directive includes transmitting at least one of a unicast message, a multicast message, or a broadcast message.

6. The method of claim 1, conveying the CQI reporting directive further comprising:
   communicating the CQI reporting directive from a first wireless base station to a second wireless base station utilizing backhaul network communication; and
   transmitting at least one of unicast message, a multicast message, or a broadcast message from the second wireless base station.

7. The method of claim 1, further comprising:
   analyzing a current wireless communication performance;
   improving a content of the CQI reporting directive based at least in part on the analyzed communication performance; and
   negotiating the improved CQI reporting directive.

8. The method of claim 7, the wireless communication performance including at least one of a sector traffic load, an other sector interference, or a power spectral density.

9. The method of claim 7, the wireless communication performance including at least one of a buffer size, a packet loss tolerance rate, a delay budget, or a predetermined data rate.

10. The method of claim 9, wherein the predetermined data rate includes at least one of a peak data rate, an average data rate, or a minimum guaranteed data rate.

11. The method of claim 7, the wireless communication performance including a scheduling technique.

12. A wireless communication device comprising:
    a processor configured to generate a CQI reporting directive, wherein the reporting directive comprising a set of subband-specific dynamic reporting parameters to include within a CQI report, the reporting directive further including a set of subband-specific repetition factors for specifying when a subband-specific CQI is to be used over multiple reporting periods, and a set of subband-specific reporting frequencies for the CQI report, to transmit the CQI reporting directive, and to receive a CQI report according to the reporting directive; and
    a memory coupled to the processor.

13. The wireless communication device of claim 12, wherein to generate a CQI reporting directive the processor is further configured to evaluate a set of wireless communication performance metrics.

14. The wireless communication device of claim 13, the set of wireless communication performance metrics includes at least one of a buffer size, a packet loss tolerance rate, a delay budget, or a peak data rate, wherein the predetermined data rate is at least one of a peak data rate, an average data rate, or a minimum guaranteed data rate.

15. The wireless communication device of claim 13, the set of subband-specific dynamic reporting parameters includes a set of subband-specific targeted CQI report quality level.

16. The wireless communication device of claim 13, wherein the processor is further configured to improve a content of the CQI reporting directive.

17. The wireless communication device of claim 16, wherein to improve the CQI reporting directive the processor is further configured to utilize a CQI reporting policy stored in the memory.

18. The wireless communication device of claim 13, wherein the subband-specific dynamic reporting parameters change upon changes in at least one of a channel condition, a sector traffic requirement, a sector load and a bit error rate for a CQI report.

19. A computer program product, comprising a non-transitory computer-readable medium including:
code for causing at least one computer to evaluate a set of performance metrics;
code for causing the at least one computer to generate a CQI reporting directive based at least in part on the evaluated set of performance metrics;
code for causing the at least one computer to improve a content of the CQI reporting directive at a base station, the improved CQI reporting directive comprising a set of subband-specific dynamic reporting parameters to include within a CQI report, the reporting directive further including a set of subband-specific repetition factors for specifying when a subband-specific CQI is to be used over multiple reporting periods, and a set of subband-specific reporting frequencies for the CQI report; and
code for causing the at least one computer to transmit the improved CQI reporting directive.

20. The computer-readable medium of claim 19, further including code for causing the at least one computer to transmit at least one of a unicast message, a multicast message, or a broadcast message.

21. The computer-readable medium of claim 19, further including code for causing the at least one computer to negotiate the improved CQI reporting directive with at least one separate party.

22. An apparatus that operates in a wireless communication system, the apparatus comprising:
means for assessing a set of communication performance metrics;
means for generating a CQI reporting directive based at least in part on the assessed set of performance metrics;
means for improving a content of the CQI reporting directive at a base station, the improved CQI reporting directive comprising a set of subband-specific dynamic reporting parameters to include within a CQI report, the reporting directive further including a set of subband-specific repetition factors for specifying when a subband-specific CQI is to be used over multiple reporting periods, and a set of subband-specific reporting frequencies for the CQI report; and
means for transmitting the improved CQI reporting directive.

23. The apparatus of claim 22, wherein means for transmitting the CQI reporting directive include means for communicating at least one of a unicast message, a multicast message, or a broadcast message.

24. A method for CQI reporting in a wireless communication system, the method comprising:
receiving a CQI reporting directive comprising a set of subband-specific dynamic reporting parameters to include within a CQI report, the reporting directive further including a set of subband-specific repetition factors for specifying when a subband-specific CQI is to be used over multiple reporting periods, and a set of subband-specific reporting frequencies for the CQI report;
generating a CQI report according to the received reporting directive; and
conveying the generated report.

25. The method of claim 24, conveying the generated report including transmitting T bits in a control channel.

26. The method of claim 24, further comprising:
analyzing a wireless communication performance;
improving a content of the CQI reporting directive based at least in part on the wireless communication performance; and
negotiating the improved CQI reporting directive.

27. A wireless communication device comprising:
at least one processor configured to receive a CQI reporting directive comprising a set of subband-specific dynamic reporting parameters to include within a CQI report, the reporting directive further including a set of subband-specific repetition factors for specifying when a subband-specific CQI is to be used over multiple reporting periods, and a set of subband-specific reporting frequencies for the CQI report, to generate a CQI report according to the received reporting directive, to convey the generated report; and
a memory coupled to the at least one processor.

28. The wireless communication device of claim 27, wherein the received CQI reporting directive includes a set of subband-specific targeted CQI report quality level.

29. The wireless communication device of claim 27, wherein to convey the generated report the at least one processor is configured to transmit T bits in a control channel.

30. The wireless communication device of claim 27, wherein the at least one processor is further configured to evaluate a wireless communication performance, to improve a content of the CQI reporting directive based at least in part on the wireless communication performance; and to negotiate the improved CQI reporting directive.

31. A computer program product, comprising a non-transitory computer-readable medium including:
code for causing at least one computer to receive a CQI reporting directive comprising a set of subband-specific dynamic reporting parameters to include within a CQI report, the reporting directive further including a set of subband-specific repetition factors for specifying when a subband-specific CQI is to be used over multiple reporting periods, and a set of subband-specific reporting frequencies for the CQI report;
code for causing the at least one computer to generate a CQI report according to the received reporting directive; and
code for causing the at least one computer to transmit the CQI report.

32. The computer program product of claim 31, the received reporting directive includes at least one of a set of subband specific reporting frequencies or a CQI quality level.

33. The computer-readable medium of claim 31, further including:
code for causing the at least one computer to analyze a wireless communication performance;
code for causing the at least one computer to improve a content of the CQI reporting directive based at least in part on the analyzed wireless communication performance; and
code for causing the at least one computer to negotiate the improved CQI reporting directive.

34. The computer-readable medium of claim 33, wherein the analyzed wireless communication performance includes at least one of a buffer size, a packet loss tolerance rate, a delay budget, a predetermined data rate, or a sector throughput, wherein the predetermined data rate comprises at least one of a peak data rate, an average data rate, or a minimum guaranteed data rate.

35. An apparatus that operates in a wireless communication system, the apparatus comprising:
   means for receiving a CQI reporting directive comprising a set of subband-specific dynamic reporting parameters to include within a CQI report, the reporting directive further including a set of subband-specific repetition factors for specifying when a subband-specific CQI is to be used over multiple reporting periods, and a set of subband-specific reporting frequencies for the CQI report;
   means for generating a CQI report according to the received reporting directive; and
   means for transmitting the generated CQI report.

36. The apparatus of claim 35, further comprising:
   means for analyzing a set of performance metrics;
   means for improving a content of the CQI reporting directive based at least in part on the set of performance metrics; and
   means for negotiating the improved CQI reporting directive.

37. The apparatus of claim 36, wherein the set of performance metrics include at least one of a buffer size, a packet loss tolerance rate, a delay budget, or a peak data rate, wherein the predetermined data rate includes at least one of a peak data rate, an average data rate, or a minimum guaranteed data rate.

38. The apparatus of claim 35, wherein the received CQI reporting directive includes a set of subband-specific targeted CQI report quality levels.

* * * * *